United States Patent
Jeong (10) Patent No.: US 11,345,216 B2
(45) Date of Patent: May 31, 2022

(54) SHIFT SHOCK REDUCTION CONTROL METHOD OF AMT VEHICLE

(71) Applicants: Hyundai Motor Company, Seoul (KR); Kia Motors Corporation, Seoul (KR)

(72) Inventor: Seong-Bin Jeong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 469 days.

(21) Appl. No.: 16/670,900

(22) Filed: Oct. 31, 2019

(65) Prior Publication Data

US 2020/0353794 A1 Nov. 12, 2020

(30) Foreign Application Priority Data

May 7, 2019 (KR) .................... 10-2019-0053071

(51) Int. Cl.
  *B60W 10/10* (2012.01)
  *B60W 10/30* (2006.01)
  *B60H 1/32* (2006.01)
  *F16H 61/04* (2006.01)
  *F16H 61/02* (2006.01)

(52) U.S. Cl.
  CPC .......... *B60H 1/3208* (2013.01); *B60W 10/10* (2013.01); *B60W 10/30* (2013.01); *F16H 61/0437* (2013.01); *F16H 2061/0234* (2013.01); *F16H 2061/0241* (2013.01)

(58) Field of Classification Search
  CPC ..... B60H 1/3208; B60W 10/10; B60W 10/30; B60W 10/11; B60W 30/19; F16H 61/0437; F16H 2061/0234; F16H 2061/0241
  See application file for complete search history.

(56) References Cited

U.S. PATENT DOCUMENTS

| | | | |
|---|---|---|---|
| 4,658,943 A * | 4/1987 | Nishikawa ............ | B60K 25/02 62/133 |
| 2002/0092310 A1* | 7/2002 | Murase ................ | B60H 1/3208 62/133 |
| 2012/0143431 A1* | 6/2012 | Kim .................... | G05B 23/0216 701/32.8 |
| 2015/0018172 A1* | 1/2015 | Koberstein ....... | B60W 30/1886 477/98 |
| 2017/0349179 A1* | 12/2017 | Cunningham ...... | B60W 10/026 |

FOREIGN PATENT DOCUMENTS

KR    10-2014-0033958 A    3/2014

\* cited by examiner

*Primary Examiner* — Edwin A Young
(74) *Attorney, Agent, or Firm* — Morgan, Lewis & Bockius LLP (57) ABSTRACT

An automated manual transmission (AMT) shift shock reduction control method may include a compressor delay control that is configured to keep an operation of a compressor as a non-operation state until a delay time is reached during a shift control, when an air conditioner signal and a shift signal are detected by an Engine Management System (EMS).

19 Claims, 6 Drawing Sheets

SHIFT SHOCK REDUCTION CONTROL METHOD OF AMT VEHICLE

CROSS-REFERENCE TO RELATED APPLICATION

The present application claims priority to Korean Patent Application No. 10-2019-0053071, filed on May 7, 2019, the entire contents of which is incorporated herein for all purposes by this reference.

BACKGROUND OF THE DISCLOSURE

Field of the Disclosure

The present invention relates to an AMT vehicle, and more particularly, to an AMT vehicle, which implements a shift shock reduction control capable of greatly lowering shift shock even with a fixed compressor.

Description of Related Art

Recently, an Automated Manual Transmission (AMT), which has a high mounting rate in vehicles, has an advantage capable of meeting environmental regulations (e.g., fuel efficiency) and profitability improvement demand.

This reason is because the AMT can provide operational convenience such as an Automated Transmission (AT) with an actuator that replaces a clutch of a Manual Transmission (MT) while having the same structure as the MT in which a transmission itself has no torsional damper function, and furthermore, can also reduce $CO_2$ emissions and secure price competitiveness as compared to the AT.

Furthermore, a Double Clutch Transmission (DCT), which is the same classification as the AMT, is a tendency that a vehicle mounting rate is further increased by mitigating the shift shock occurred during a shift control by two clutches in the AMT applying one clutch.

Therefore, a vehicle mounting the AMT or the DCT is characterized as an AMT vehicle.

However, although the AMT vehicle has advantages of excellent fuel efficiency, power performance, and convenient operation, it is limitedly mounted in some compact vehicles that give priority to price competitiveness.

This reason is because the AMT has a disadvantage which is associated with an operation of a fixed compressor for an air conditioning system, such as a Heating, Ventilation and Air Conditioning (HVAC) (or a Full Auto Temperature Control System (FATC)) at the time of shifting to occur a relatively large shift shock as compared to that in the AMT.

For example, this is because the HVAC implements the operation of the fixed compressor with a fixed COMP (Compressor) control logic, and the fixed COMP control logic does not consider an AMT shift control situation at all upon ON/OFF of the fixed compressor even if the AMT has a structure that has no the torsional damper such as the MT, such that when the COMP ON becomes during shifting, the amount of shock transferred to a vehicle interior becomes greater than the basic difference to the degree of occurring the quality problem.

Therefore, it may be seen that it is possible to solve the shock amount quality problem by the COMP ON/OFF which is not covered by the fixed COMP control logic of the HVAC with a variable compressor, but the application of the variable compressor is accompanied by an increase in cost as compared to the fixed compressor, such that there inevitably exist other limitations in that the price competitiveness cannot be kept even in India, China, and Europe where the AMT, which has the excellent fuel efficiency, the power performance, and the convenient operation, is demanded.

Therefore, it is demanded to improve the fixed COMP control logic of the HVAC capable of occupying price competitiveness predominance over the variable compressor to preempt the market of the AMT vehicle demanded all over the world as a vehicle maker.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift shock reduction control method of an AMT vehicle, which delays the operation of the compressor with respect to the COMP ON/OFF command during AMT shifting, blocking a change in the operating state of the fixed compressor during shifting greatly affecting the occurrence of shift shock, and accompanies a heater control at the COMP ON command delay during shifting, not occurring an icing phenomenon of an evaporator due to the driving delay of the compressor either.

An AMT shift shock reduction control method of the present invention for achieving the object may include a compressor delay control that is configured to keep an operation of a compressor as a non-operation state during a shift control until reaching a delay time, when an air conditioner signal and a shift signal are detected by an EMS together.

As an exemplary embodiment of the present invention, the EMS receives the shift signal from a Transmission Control Unit (TCU) via a CAN communication, and detects the air conditioner signal from an air conditioner switch of an HVAC as an air conditioner ON signal for operating the compressor and an air conditioner OFF signal for stopping the compressor.

As an exemplary embodiment of the present invention, the compressor delay control is configured to set the delay time, and to perform with a delay time control configured to determine whether it has reached the delay time, and a low temperature icing prevention control configured to prevent an icing phenomenon of an evaporator by operating a heater until the delay time is reached.

As an exemplary embodiment of the present invention, the delay time control performs with distinguishing a compressor command according to the air conditioner signal, confirming the compressor command as a COMP ON command signal and a COMP OFF command signal, and setting a COMP ON delay time (COMP $ON_{dt}$) meeting the COMP ON command signal or a COMP OFF delay time (COMP $OFF_{dt}$) meeting the COMP OFF command signal as the delay time, respectively.

As an exemplary embodiment of the present invention, each of the COMP ON delay time and the COMP OFF delay time is set in units of seconds.

As an exemplary embodiment of the present invention, the low temperature icing prevention control performs with determining whether it has reached the delay time with a delay time count, confirming an evaporator icing condition with respect to the evaporator during the delay time count, performing an operation of the heater until the delay time is reached at the time of satisfying the evaporator icing condition, and stopping the operation of the heater at the time of not satisfying the evaporator icing condition or at the time of reaching the delay time.

As an exemplary embodiment of the present invention, the evaporator icing condition is a case where an evaporator ambient temperature detected by a thermistor sensor mounted at the evaporator to be transmitted to the EMS is 0° C. or less.

As an exemplary embodiment of the present invention, the operation of the heater includes an operation of a heater diaphragm, and the heater diaphragm exposes the heater to the evaporator, and the heater diaphragm connected to an actuator is performed by an operation of the actuator by a heater controller electrically connected to the EMS.

As an exemplary embodiment of the present invention, the operation of the compressor is performed by a fixed COMP control that controls an operating state of the compressor, and the operating state of the compressor is controlled by the EMS detecting as a COMP operation factor any one of an air conditioner switch signal, a blower signal, a thermistor sensor signal, and an air conditioner pressure.

As an exemplary embodiment of the present invention, the shift control is performed in a TCU for controlling an AMT.

As such, an AMT vehicle of the present invention for achieving the object may include an EMS for performing a compressor delay control that keeps a compressor as a non-operation state until a delay time is reached during a shift control when an air conditioner signal and a shift signal are detected simultaneously and then performing a fixed COMP control that is configured to operate the compressor after the delay time is reached; and a TCU for performing the shift control by controlling the AMT, and transferring the shift signal to the EMS.

As an exemplary embodiment of the present invention, the compressor is a fixed compressor having a clutch controlled by the EMS, and forms a HVAC. The HVAC may include a heater controller electrically connected to the EMS, and the heater controller controls an operation of an actuator so that a heater diaphragm covering an evaporator facing the heater and connected to the actuator is tilted while operating the heater at the compressor delay control.

As an exemplary embodiment of the present invention, the operation of the heater is performed when an evaporator ambient temperature detection value detected by a thermistor sensor provided at the evaporator is 0° C. or less.

The shift shock reduction control applied to the AMT vehicle of the present invention implements the following operations and effects even in the interlocking control of the AMT and the fixed compressor.

Firstly, since the fixed compressor is used to solve the chronic AMT shift shock of the AMT vehicle as it is, it does not require a change in the variable compressor with respect to the air conditioning system. Secondly, it is possible to use the fixed compressor having cost competitiveness as it is even while greatly lowering the shift shock. Thirdly, it is possible to variably set the COMP ON/OFF command delay time for shift shock reduction, meeting the merchantability for the shift sense of the AMT. Fourthly, it is possible to accompany the heater control at the COMP ON/OFF command delay for shift shock reduction, also solving a concern about the icing phenomenon of the condenser. Fifthly, it is possible to reduce the entire region of the COMP ON that has a high fuel efficiency consumption ratio as compared to the COMP OFF during AMT shifting upon traveling thereby improving the fuel efficiency. Sixthly, it is possible to preempt the market of the AMT vehicle which is demanded all over the world for the price competitiveness predominant of the AMT vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying exemplary drawings, and since these embodiments are one example and may be implemented in various different forms by those skilled in the art to which an exemplary embodiment of the present invention pertains, they are not limited to the exemplary embodiments described herein.

Figure 1:
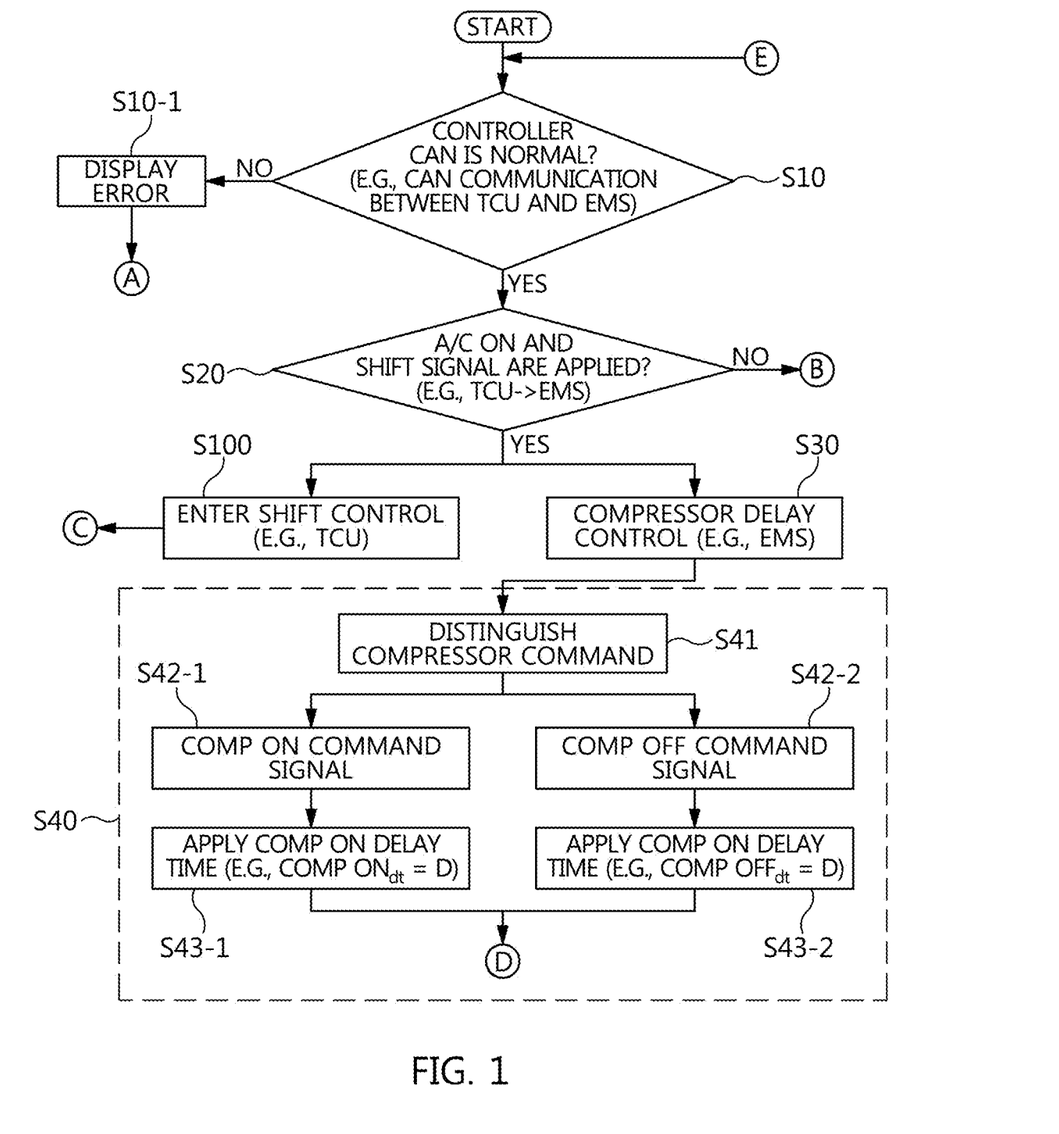
FIG. 1 and FIG. 2 are flowcharts of an AMT shift shock reduction control method according to an exemplary embodiment of the present invention.
Figure 2:
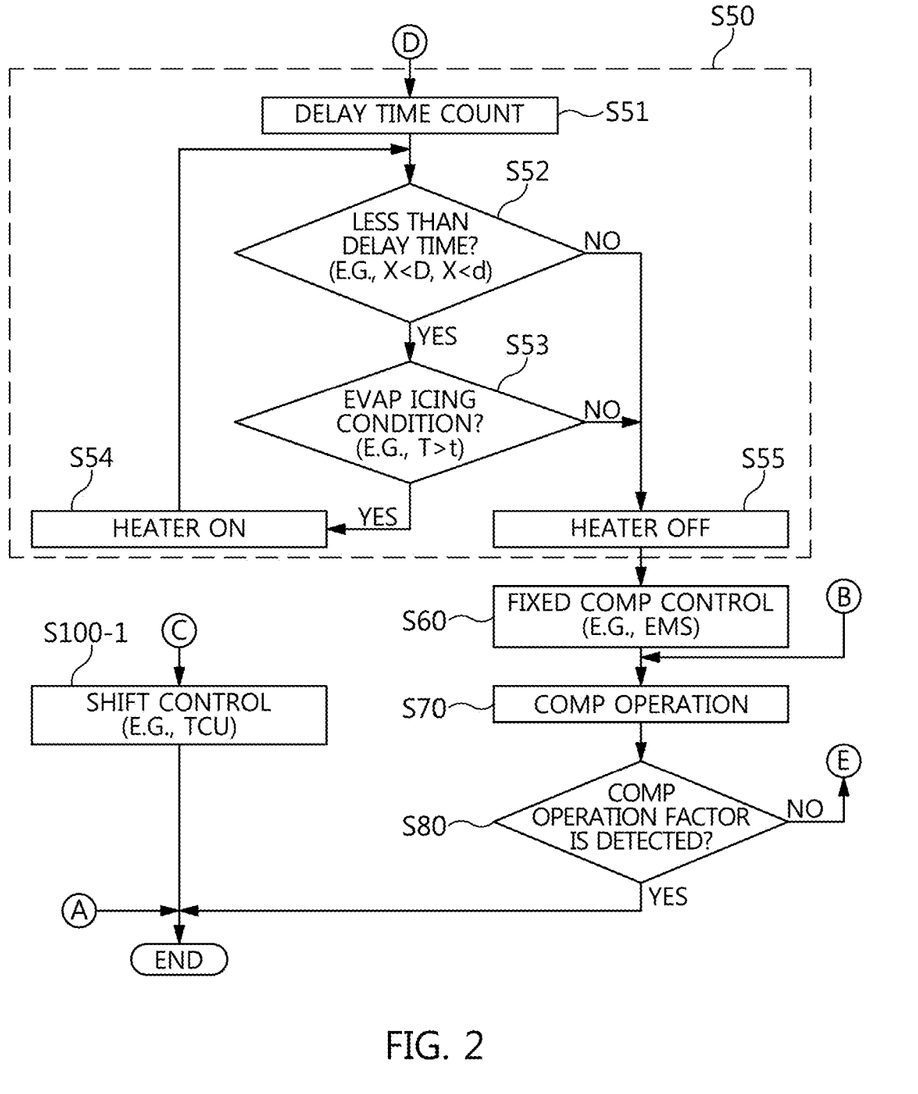

Referring to FIG. 1 and FIG. 2, an AMT shift shock reduction control method can perform a fixed compressor control of an air conditioning system as before by performing a shift control S100 and S100-1 of the AMT or directly switching into a fixed COMP control S60 to S80 together with a fixed compressor control of the air conditioning system from a compressor delay control S30 to S50 to the fixed COMP control S60 to S80 as a result of the AMT/air conditioning interlocking condition control S10 and S20 using an air conditioner operating signal A/C ON and a shift signal.

The compressor delay control S30 to S80 enters the fixed COMP control S60 to S80 after a compressor driving delay by a delay time S40 and an evaporator EVAP icing prevention by a heater S50, solving shift shock configured for causing the operation of a compressor COM during shifting.

Figure 3:
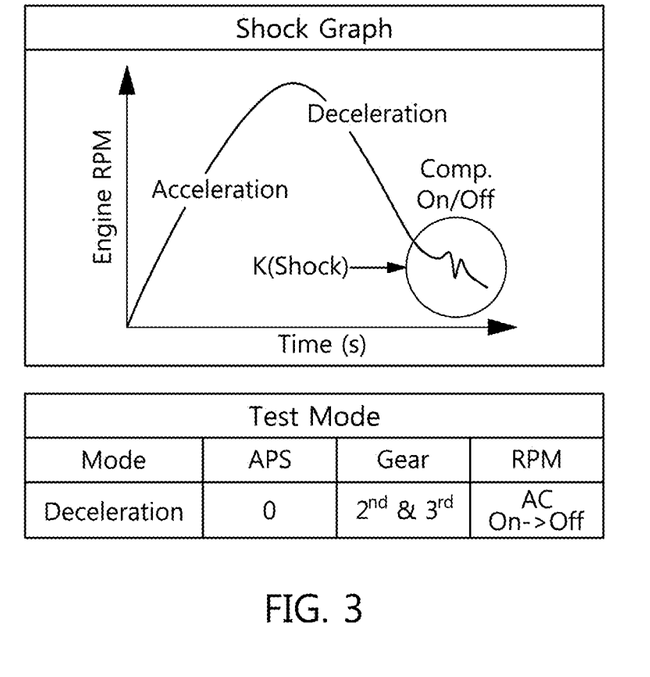
FIG. 3 is a shift shock line diagram illustrating shift shock due to ON/OFF of a compressor solved by a compressor delay control of a AMT shift shock reduction control according to an exemplary embodiment of the present invention.

For example, referring to FIG. 3, a shift shock line diagram indicating an engine RPM according to the elapse of time exemplifies the occurrence of the shift shock K due to a fixed compressor driving change COMP ON/OFF of the air conditioning system during shifting of the AMT having no torsional damper.

Therefore, it may be seen that the shock amount transferred to the vehicle interior is occurred greater than a basic difference when the shift shock K is applied by matching an operation of the fixed compressor (e.g., COMP ON) during shifting of the AMT together. However, the compressor delay control S30 to S80 does not affect a change in an engine RPM due to the compressor driving delay due to the delay time, not occurring the shift shock K.

Therefore, the AMT shift shock reduction control method can solve the disadvantage of the shift shock due to the compressor driving change COMP ON/OFF in the AMT in which the fixed compressor is applied as it is instead of the variable compressor in the air conditioning system control through the compressor delay control S30 to S80, satisfying the market demand for the AMT, which has advantages of excellent fuel efficiency, power performance, and convenient operation.

Figure 4:
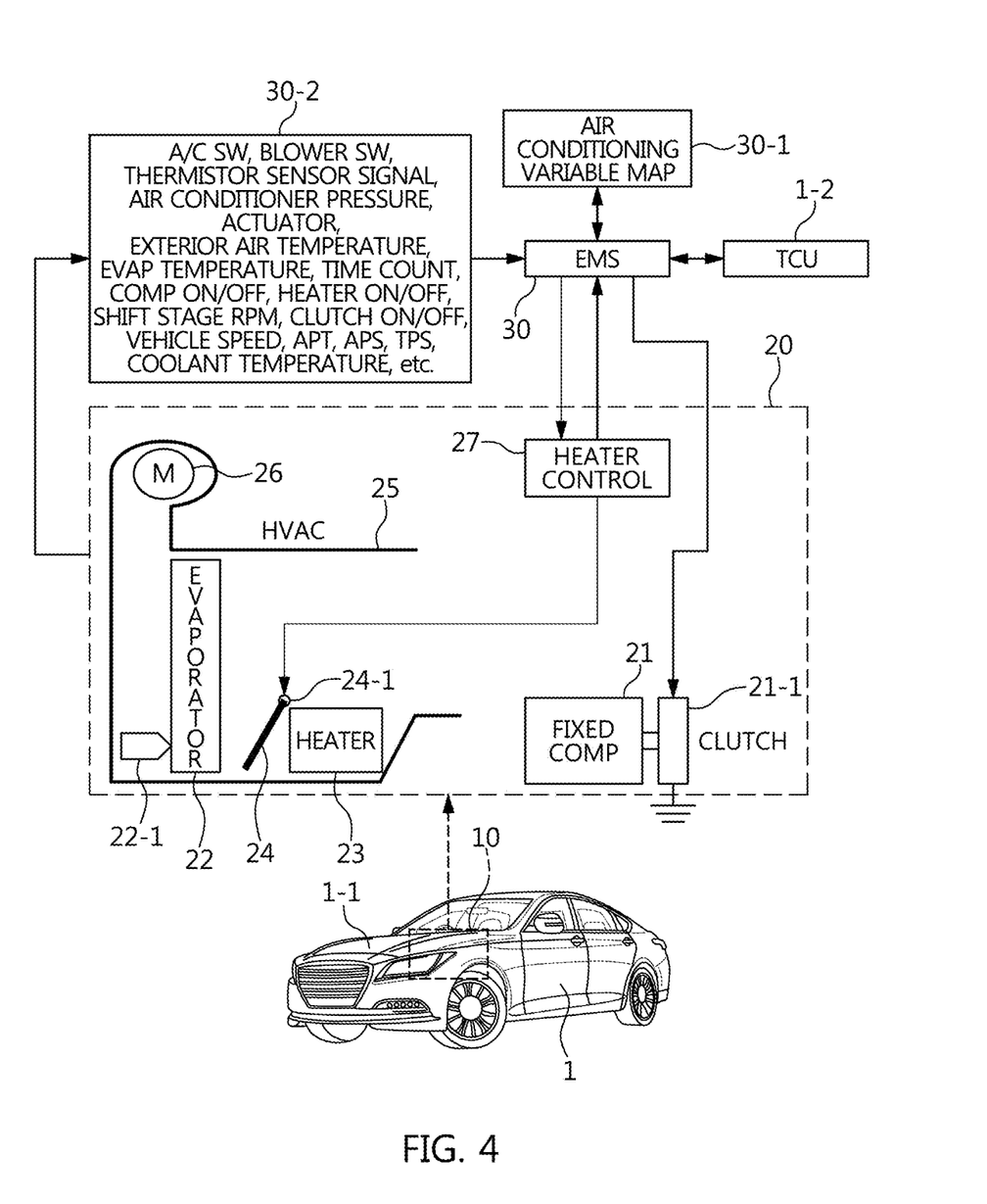
FIG. 4 is a diagram illustrating a configuration example of the AMT vehicle in which the AMT shift shock reduction control according to an exemplary embodiment of the present invention is implemented.

Meanwhile, FIG. 4 is a diagram illustrating an example of an AMT vehicle 1 for implementing the AMT shift shock reduction control.

As illustrated, the AMT vehicle 1 includes an Automated Manual Transmission (AMT) 1-1 and an air conditioning system 10.

The AMT 1-1 includes an actuator that replaces a clutch of a Manual Transmission (MT) while having the same structure as the MT in which a transmission itself has no torsional damper function, and controlled by a Transmission Control Unit (TCU) 1-2. The TCU 1-2 performs a shift control of the AMT 1-1 with shift information, and transfers a shift signal to an EMS 30 as data via a Controller Area Network (CAN) communication. The TCU 1-2 has a memory in which shift control logic for performing a shift control S100 and S100-1 has been programmed and stored.

The AMT 1-1 may be a Double Clutch Transmission (DCT).

The air conditioning system 10 includes a Heating, Ventilation and Air Conditioning (HVAC) 20 and the Engine Management System (EMS) 30.

The HVAC 20 includes a compressor 21, an evaporator 22, a heater 23, an air conditioning duct 25, a blower 26, and a heater controller 27, and is operated to keep a comfortable vehicle interior environment by integrating cooling/heating and ventilation functions. Therefore, the HVAC 20 may be replaced with a Full Auto Temperature Control System (FATC) for keeping a comfortable internal space regardless of the external condition by automatically adjusting the blowing direction, the blowing amount, the internal air, and the inflow state of the external air.

For example, the compressor 21 and the evaporator 22 are connected to a condenser for changing in phase air-conditioner refrigerant from gas to liquid. The compressor 21 is a fixed compressor having a clutch 21-1 connected or disconnected by a control by the EMS 30, and compresses for the phase change of the air-conditioner refrigerant. The evaporator 22 changes in phase the air-conditioner refrigerant from liquid togas, and has a thermistor sensor 22-1. The thermistor sensor 22-1 transfers the detection temperature of the evaporator 22 to the EMS 30 as an evaporator icing temperature via a CAN communication.

For example, the heater 23 operates under a control of the heater controller 27 connected to the EMS 30 to increase the internal temperature of the air conditioning duct 25. A heater diaphragm 24 shields the front side of the heater 23 so that the heat of the heater 23 is not transferred to the evaporator 22. An actuator 24-1 operates under the control of the heater controller 27 connected to the EMS 30 to tilt the heater diaphragm 24 so that the heat of the heater 23 is transferred to the evaporator 22. The actuator 24-1 utilizes a servo motor.

For example, the air conditioning duct 25 provides a place where the evaporator 22, the thermistor sensor 22-1, the heater 23, the heater diaphragm 24, the actuator 24-1, and the blower 26 are mounted, and forms the blowing passage of the external air received by the blower 26. The blower 26 draws the external air to produce the air volume of the air conditioning duct 25 and adjusts the air conditioner cooling intensity by the RPM of a motor according to the number of operating steps. The heater controller 27 is connected to the EMS 30 to control the heater 23 and the actuator 24-1, respectively.

The EMS 30 performs the CAN communication with the TCU 1-2, the thermistor sensor 22-1, and the heater controller 27, determines the shift state of the AMT 1-1 with the shift signal of the TCU 1-2, determines the icing of the evaporator 22 at the evaporator icing temperature of the thermistor sensor 22-1, and outputs an actuator operating signal ON/OFF to the heater controller 27. Furthermore, the EMS 30 can connect a memory, in which the logics of the AMT/air-conditioning interlocking condition control S10 and S20 and the compressor delay control S30 to S80 has been programmed and stored, to a central processing unit to detect, compute, and determine data for control.

Furthermore, the EMS 30 has an air conditioning variable map 30-1, and has or connects a data processor 30-2.

For example, the air conditioning variable map 30-1 matches the operation condition of the compressor 21 by use of as a COMP control factor an air conditioner switch signal A/C SW, a blower signal Blower SW, a thermistor sensor signal, an air conditioner pressure [e.g., an Air conditioner Pressure Transducer (APT) indicating a refrigerant pressure], etc. To provide it to the EMS 30 as compressor delay and ON/OFF information.

For example, the data processor 30-2 utilizes the A/C SW, the Blower SW, the thermistor sensor signal, the air conditioner pressure, the actuator, the external air temperature, the EVAP temperature, the Time Count, the COMP ON/OFF, the heater ON/OFF, the shifting stage RPM (or the engine RPM), the clutch ON/OFF, the vehicle speed, the APT, the Accel Pedal Sensor (APS), the Throttle Position Sensor (TPS), the coolant temperature, etc. As input data to provides it to the EMS 30. In the instant case, the data processor 30-2 may be an Engine Control Unit (ECU) of the engine.

Hereinafter, the AMT shift shock reduction control method of FIG. 1 and FIG. 2 will be described in detail with reference to FIG. 4, FIG. 5, FIG. 6, and FIG. 7. In the instant case, the control subject is the EMS 30 connected to the TCU 1-2 and the heater controller 27, and the control object includes any one of the compressor 21, the clutch 21-1, the heater 23, and the actuator 24-1.

First, the EMS 30 performs the AMT/air conditioning interlocking condition control S10 and S20 with confirming that a controller CAN is normal S10 and confirming that the A/C ON and the shift signal are applied S20.

Referring to FIG. 4, the EMS 30 confirms that the communication with respect to the system including the TCU 1-2 and the heater controller 27 is normal with a CAN communication bit. As such, the EMS 30 confirms the shift signal transferred from the TCU 1-2, and confirms the A/C switch signal among the A/C SW, the Blower SW, the thermistor sensor signal, the air conditioner pressure, the actuator, the external air temperature, the EVAP temperature, the Time Count, the COMP ON/OFF, the heater ON/OFF, the shifting stage RPM, the clutch ON/OFF, the vehicle speed, the APT, the APS, the TPS, and the coolant temperature, which have been provided from the data processor 30-2 as input data.

As a result, when the controller CAN communication is abnormal in the S10, the EMS 30 switches to the S10-1 to display a CAN ERROR in a driver seat cluster of the AMT vehicle 1 and then stops the logic execution, while when the controller CAN communication is normal, it enters the S20 to confirm the air conditioner operating signal A/C ON and the shift signal.

Finally, when only the air conditioner operating signal A/C ON is detected in the S20, the EMS 30 directly enters the fixed COMP control S60 to S80.

On the other hand, when the shift signal is detected together with the air conditioner operating signal A/C ON, the EMS 30 passes through the compressor delay control S30 to S80 and then enters the fixed COMP control S60 to S80. In the instant case, the TCU 1-2 performs the shift control S100 and S100-1.

As such, the EMS 30 performs the compressor delay control S30 to S80 with the delay time control S40 and the low temperature icing prevention control S50.

Referring to FIG. 4, the EMS 30 provides to the TCU 1-2 the vehicle speed, the shifting stage RPM (or the engine RPM), the APT, the APS, the TPS, and the coolant temperature while directly using the COMP ON/OFF and the APT among the input data provided from the data processor 30-2, and recognizes an A/C SW request signal of the heater controller 27.

The delay time control S40 performs with distinguishing a compressor command S41, confirming a COMP ON command signal S42-1, applying a COMP ON delay time S43-1, confirming a COMP OFF command signal S42-2, and applying a COMP OFF delay time S43-2.

For example, the distinguishing the compressor command S41 is divided into the confirming of the COMP ON command signal S42-1 and the confirming of the COMP OFF command signal S42-2 by use of the COMP ON command signal and the COMP OFF command signal.

Therefore, the applying the COMP ON delay time S43-1 applies an ON delay time formula, and the applying the COMP OFF delay time S43-2 applies an OFF delay time formula.

ON delay time formula: COMP $ON_{dt}=D$
OFF delay time formula: COMP $OFF_{dt}=d$ Herein, "COMP $ON_{dt}$" refers to the COMP ON delay time, "D" refers to an ON delay time threshold which is set to about 3 to 4 seconds, "COMP $OFF_{dt}$" refers to the COMP OFF delay time, and "d" refers to an OFF delay time threshold which is set to about 3 to 5 seconds.

The D (the ON delay time threshold) is preferably set to about 3 seconds. This is because even if the compressor 21 is driven late for 3 seconds after the air conditioner ON, the cooling performance of the air conditioner does not deteriorate as well as a driver (or a passenger) cannot recognize the air conditioner. On the other hand, the d (the OFF delay time threshold) is preferably set to about 4 seconds. This is because the icing of the evaporator 22 is affected not only by the external air temperature of the ice crystal or less and the operating state of the compressor 21 but also the air heating time by the heater 23 is needed. However, the D (the ON delay time threshold) and the d (the OFF delay time threshold) may be equally set to about 3 seconds considering the performance of the compressor 21.

As a result, the delay time control S40 decides the D (the ON delay time threshold) or the d (the OFF delay time threshold).

The low temperature icing prevention control S50 performs with counting the delay time S51, confirming the delay time S52, confirming the evaporator EVAP icing condition S53, performing the heater ON S54, and performing the heater OFF S55.

For example, the counting the delay time S51 is performed by accumulating the count with respect to the D (the ON delay time threshold) or the d (the OFF delay time threshold). In the instant case, the count accumulation may be performed in units of seconds or in units of milliseconds (ms) considering the shift control time. The confirming of the delay time S52 applies an under-delay time determination formula.

Under-delay time determination formula: X<D, X<d

Herein, "X<D" refers to the under-delay time determination formula of the COMP ON command S42-1 and S43-1, "X<d" refers to the under-delay time determination formula of the COMP OFF command S42-2 and S43-2, "X" refers to a delay time count value at the determination time point, and "<" refers to the inequality indicating the magnitude relation of the two values.

As a result, when the delay time count value X is greater than the D (the ON delay time threshold) or the d (the OFF delay time threshold), the EMS 30 switches to the fixed COMP control S60 to S80 through the performing the heater OFF S55.

Therefore, the delay time count value X delays the COMP operating time of the compressor 21 for the time during shifting even if the COMP operating logic (e.g., the fixed COMP control logic) of the air conditioning system 10 independently generates the COMP ON command or the COMP OFF command with respect to the compressor 21 when the EMS 30 determines during shifting using the shift information received from the TCU 1-2, and the delay of the COMP operating time eliminates a change in a COMP operating torque of the compressor 21 affecting the engine RPM during shifting, reducing or solving the shift shock K (see FIG. 3).

On the other hand, when the delay time count value X is smaller than the D (the ON delay time threshold) or the d (the OFF delay time threshold), the EMS 30 performs the confirming of the evaporator EVAP icing condition S53.

For example, the confirming of the evaporator EVAP icing condition S53 applies the evaporator ambient temperature, and confirms it by use of an evaporator icing determination formula.

Evaporator icing determination formula: T>t

Herein, "T" refers to the evaporator ambient temperature detection value of the evaporator 22 detected by the thermistor sensor 22-1 at the determination time point, and "t" refers to the icing temperature threshold, which is set to 0° C. or less considering the icing of water.

As a result, when the evaporator ambient temperature detection value T exceeds the icing temperature threshold t, the EMS 30 switches to the performing the heater ON S54 to operate the heater 23 and feedbacks to the confirming of the delay time S52. On the other hand, when the evaporator ambient temperature detection value T does not exceed the icing temperature threshold t, the EMS 30 enters the performing the heater OFF S55 to keep the operation stop state of the heater 23 and then switches to the fixed COMP control S60 to S80.

Figure 5:
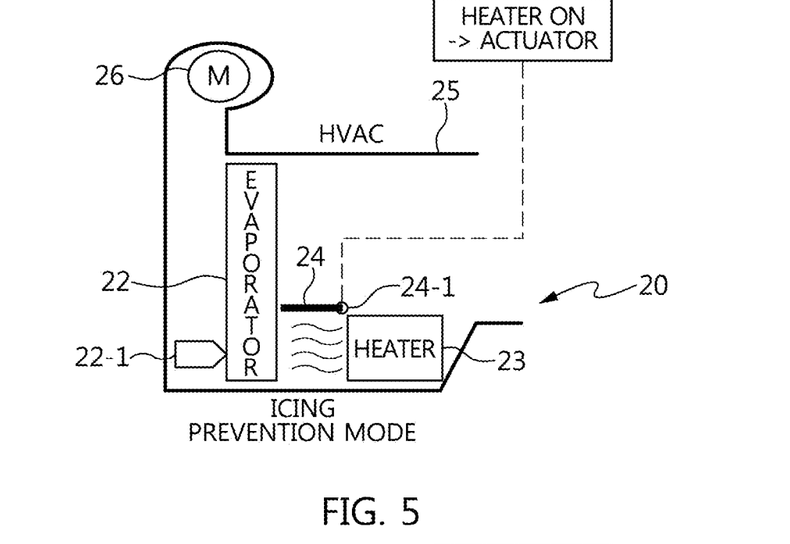
FIG. 5 is a diagram illustrating a switched state into an icing prevention mode connected to a heater at the compressor delay control according to an exemplary embodiment of the present invention.

Referring to the operation of the heater ON in the HVAC 20 of FIG. 5, the heater controller 27 operates the heater 23 and the actuator 24-1 with a heater ON and an actuator ON signal transmitted from the EMS 30 (see FIG. 4), respectively.

As such, the heater 23 generates heat to warm the air inside the air conditioning duct 25, and the actuator 24-1 tilts the heater diaphragm 24 upwards so that the evaporator 22 and the heater 23 face each other. As a result, the moisture formed in the evaporator 22 due to the low temperature is heated by the air heated by the heater 23 so that the evaporator 22 is not iced.

As such, the EMS 30 receives the temperature information related to the evaporator 22 detected by the thermistor sensor 22-1, and compares the evaporator ambient temperature detection value T and the icing temperature threshold t in a condition where the delay time count value X is smaller than the D (the ON delay time threshold) or the d (the OFF delay time threshold).

Therefore, the EMS 30 keeps the heater ON and the actuator ON signal when the evaporator ambient temperature detection value T exceeds the icing temperature threshold t.

Referring to the operation of the heater OFF in the HVAC 20 of FIG. 5, the EMS 30 transmits the heater OFF and the actuator OFF signal to the heater controller 27 when the evaporator ambient temperature detection value T does not exceed the icing temperature threshold t.

Figure 6:
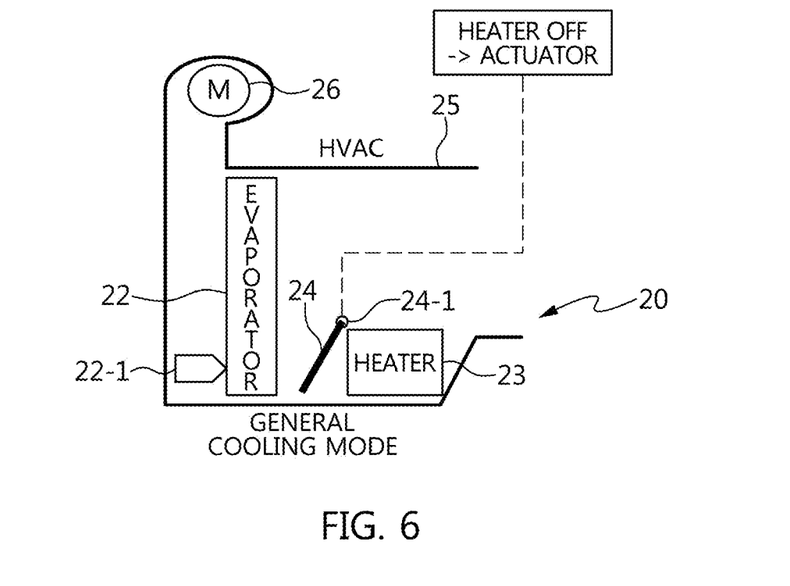
FIG. 6 is a diagram illustrating a switched state into a general cooling mode not connected to the heater at the compressor delay control according to an exemplary embodiment of the present invention.

As such, the heater controller 27 lowers the heater diaphragm 24 again by the restoring force of the internal return spring (or the reverse rotation of the actuator) according to the stop of the actuator 24-1 while stopping the operation of the heater 23, covering between the evaporator 22 and the heater 23.

As described above, the EMS 30 utilizes the evaporator ambient temperature detection value T, preventing an icing phenomenon of an evaporator 22, which may be occurred by the operation stop (i.e., the operation delay) of the compressor 21 against the air conditioner operation request during shifting, by the operation of the heater 23.

Thereafter, the EMS 30 performs the fixed COMP control S60 with operating the COMP S70 and confirming that a COMP operation factor is detected S80.

For example, since the operating the COMP S70 means the operation of the compressor 21, the air volume of the blower 26 is adjusted according to an operation of the air conditioner. The confirming that the COMP operation factor is detected S80 detects a COMP control factor during the operation of the compressor 21, and feedbacks to the confirming that the controller CAN is normal S10 while continuing the driving of the compressor 21 at the time of detecting the COMP control factor, while it terminates the logic execution while stopping the compressor 21 when the COMP control factor is not detected.

Figure 7:
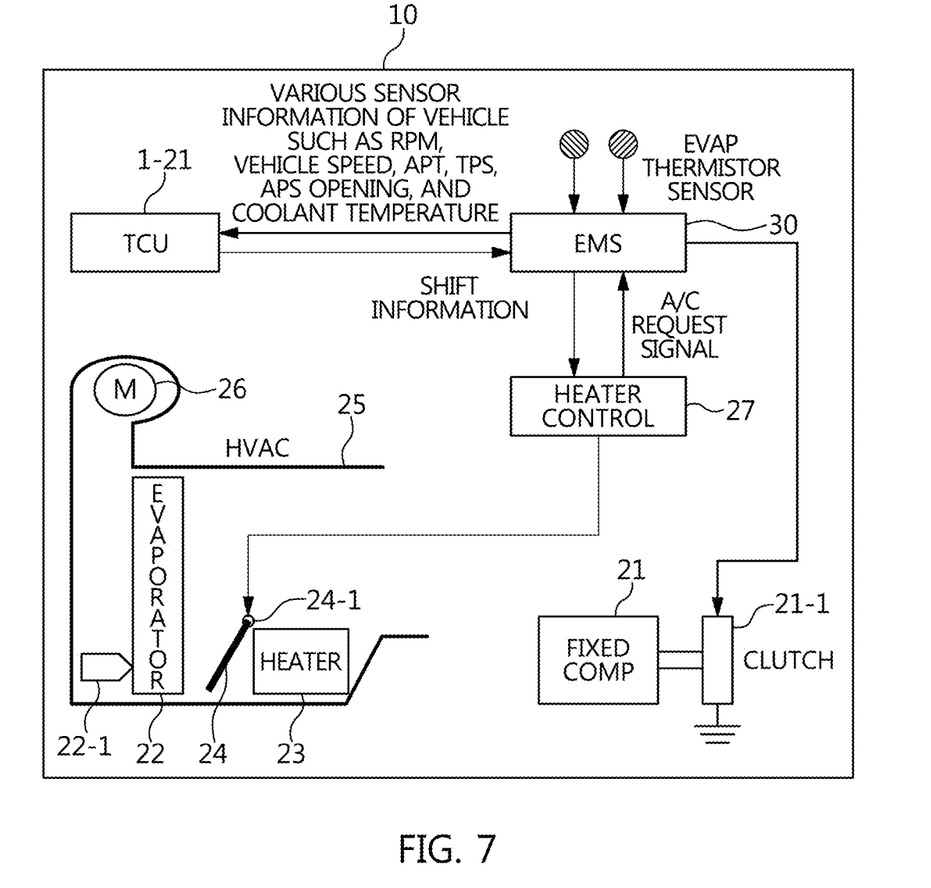
FIG. 7 is a diagram illustrating an example of an operating state in which an EMS according to an exemplary embodiment of the present invention controls cooperatively with a TCU for performing the AMT shift control.

Referring to FIG. 7, the EMS 30 outputs the clutch ON signal to operate the clutch 21-1 so that the compressor 21 is switched to a driving state. Furthermore, the EMS 30 detects the air conditioner switch signal, the blower signal, the thermistor sensor signal, and the air conditioner pressure (or the APT) as the COMP control factor to continue the driving of the compressor 21 at the air conditioner switch ON, while it stops the driving of the compressor 21 at the air conditioner switch OFF.

Meanwhile, the shift control S100 and S100-1 is performed by the TCU 1-2, and the TCU 1-2 enters the shift control S100 and then performs the shift control S100-1. In the instant case, the performing the shift control S100-1 is based on the unique AMT shift control logic built in the TCU.

Referring to FIG. 7, the EMS 30 provides to the TCU 1-2 the vehicle speed, the shifting stage RPM (or the engine RPM), the APT, the APS, the TPS, the coolant temperature, etc. Among the A/C SW, the Blower SW, the thermistor sensor signal, the air conditioner pressure, the actuator, the external air temperature, the EVAP temperature, the Time Count, the COMP ON/OFF, the heater ON/OFF, the shifting stage RPM, the clutch ON/OFF, the vehicle speed, the APT, the APS, the TPS, and the coolant temperature, which have been provided from the data processor 30-2 as input data.

Therefore, the EMS 30 has a feature that performs the function such as the ECU of the engine for assisting the shift control of the TCU 1-2.

As described above, the shift shock reduction control method of the AMT vehicle according to the exemplary embodiment performs the compressor delay control S30 to S50 that keeps the compressor 21 as a non-operation state until the delay time is reached during the shift control and then performs the fixed COMP control S60 to S80 that operates the compressor 21 after the delay time is reached, when the air conditioner signal and the shift signal are detected by the EMS 30 together, greatly lowering the shift shock due to the request for the ON/OFF operation of the fixed compressor, and, it accompanies the heater control at the COMP ON command delay during shifting, also preventing an icing phenomenon of an evaporator 22 due to the driving delay of the compressor 21.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An automated manual transmission (AMT) shift shock reduction control method, comprising:
performing a compressor delay control that is configured to keep an operation of a compressor as a non-operation state until a delay time is reached during a shift control, in a response that an air conditioner signal and a shift signal are detected by an Engine Management System (EMS).

2. The AMT shift shock reduction control method of claim 1,
wherein the EMS is configured to receive the shift signal from a Transmission Control Unit (TCU) via a Controller Area Network (CAN) communication.

3. The AMT shift shock reduction control method of claim 1,
wherein the EMS is configured to detect the air conditioner signal from an air conditioner switch of a Heating, Ventilation and Air Conditioning (HVAC), and
wherein the air conditioner signal is an air conditioner ON signal for operating the compressor and an air conditioner OFF signal for stopping the compressor.

4. The AMT shift shock reduction control method of claim 1,
wherein the compressor delay control is configured to set the delay time, and to perform with a delay time control configured to determine when the delay time has been reached, and an icing prevention control configured to prevent an icing phenomenon of an evaporator by operating a heater until the delay time is reached.

5. The AMT shift shock reduction control method of claim 4,
wherein the delay time control is configured to perform with distinguishing a compressor command according to the air conditioner signal, confirming the compressor command as a COMP ON command signal and a COMP OFF command signal, and setting a COMP ON delay time (COMP $ON_{dt}$) meeting the COMP ON command signal or a COMP OFF delay time (COMP $OFF_{dt}$) meeting the COMP OFF command signal as the delay time, respectively.

6. The AMT shift shock reduction control method of claim 5,
wherein each of the COMP ON delay time and the COMP OFF delay time is set in units of seconds.

7. The AMT shift shock reduction control method of claim 4,
wherein the icing prevention control is configured to perform with determining when the delay time has been reached with a delay time count, confirming an evaporator icing condition with respect to the evaporator during the delay time count, performing an operation of the heater until the delay time is reached at a time of satisfying the evaporator icing condition, and stopping the operation of the heater at a time of not satisfying the evaporator icing condition or at a time of reaching the delay time.

8. The AMT shift shock reduction control method of claim 7,
wherein the evaporator icing condition includes an evaporator ambient temperature of 0° C. or less.

9. The AMT shift shock reduction control method of claim 8,
wherein the evaporator ambient temperature is detected by a thermistor sensor mounted at the evaporator to be transmitted to the EMS.

10. The AMT shift shock reduction control method of claim 7,
wherein the operation of the heater includes an operation of a heater diaphragm, and the operation of the heater diaphragm is configured to expose the heater to the evaporator.

11. The AMT shift shock reduction control method of claim 10,
wherein the heater diaphragm connected to an actuator is performed by an operation of the actuator by a heater controller electrically connected to the EMS.

12. The AMT shift shock reduction control method of claim 1,
wherein the operation of the compressor is performed with a fixed COMP control, and the fixed COMP control is configured to control an operating state of the compressor.

13. The AMT shift shock reduction control method of claim 12,
wherein the operating state of the compressor is controlled by one of an air conditioner switch signal, a blower signal, a thermistor sensor signal, and an air conditioner pressure, which are applied as a COMP operation factor.

14. The AMT shift shock reduction control method of claim 1,
wherein the shift control is performed by a Transmission Control Unit (TCU) configured for controlling an Automated Manual Transmission.

15. An automated manual transmission (AMT) vehicle comprising:
an Engine Management System (EMS) configured for performing a compressor delay control that keeps a compressor as a non-operation state until a delay time is reached during a shift control in a response that an air conditioner signal and a shift signal are detected and then performing a fixed COMP control that is configured to operate the compressor after the delay time is reached; and
a Transmission Control Unit (TCU) configured for performing the shift control by controlling the AMT, and transferring the shift signal to the EMS.

16. The AMT vehicle of claim 15,
wherein the compressor is a fixed compressor having a clutch controlled by the EMS.

17. The AMT vehicle of claim 15,
wherein a Heating, Ventilation and Air Conditioning (HVAC) includes the compressor.

18. The AMT vehicle of claim 17,
wherein the HVAC further includes a heater controller electrically connected to the EMS, and the heater controller is configured to control an operation of an actuator so that a heater diaphragm covering an evaporator facing the heater and connected to the actuator is tilted while operating the heater at the compressor delay control.

19. The AMT vehicle of claim 18,
wherein an operation of the heater is performed in a response that an evaporator ambient temperature detection value detected by a thermistor sensor provided at the evaporator is 0° C. or less.

* * * * *